(12) United States Patent
Jain et al.

(10) Patent No.: US 11,734,217 B2
(45) Date of Patent: Aug. 22, 2023

(54) SOFTWARE OR FIRMWARE MANAGED HARDWARE CAPABILITY AND CONTROL CONFIGURATION FOR PCIE DEVICES

(71) Applicant: XILINX, INC., San Jose, CA (US)

(72) Inventors: Sunita Jain, Bengaluru (IN); Bharat Kumar Gogada, Hyderbad (IN); Arjun Vynipadath, Palakkad (IN); Meera Bagdai, Rajkot (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/644,068

(22) Filed: Dec. 13, 2021

(65) Prior Publication Data
US 2023/0185755 A1 Jun. 15, 2023

(51) Int. Cl.
*G06F 13/42* (2006.01)
*G06F 13/40* (2006.01)

(52) U.S. Cl.
CPC ...... *G06F 13/4221* (2013.01); *G06F 13/4063* (2013.01); *G06F 2213/0026* (2013.01)

(58) Field of Classification Search
CPC .......................... G06F 13/4221; G06F 13/4063
See application file for complete search history.

(56) References Cited

U.S. PATENT DOCUMENTS

| | | | | |
|---|---|---|---|---|
| 9,026,687 | B1* | 5/2015 | Govande | G06F 13/4022 710/10 |
| 2012/0071993 | A1* | 3/2012 | Vedula | H04L 12/281 700/90 |
| 2012/0192191 | A1* | 7/2012 | Jellinek | G06F 9/5044 718/102 |
| 2016/0098365 | A1* | 4/2016 | Bshara | G06F 13/24 710/313 |
| 2017/0123987 | A1* | 5/2017 | Cheng | G06F 15/7821 |
| 2019/0095356 | A1* | 3/2019 | Milojicic | G06F 12/023 |
| 2020/0151000 | A1* | 5/2020 | Mao | G06F 9/4812 |

* cited by examiner

*Primary Examiner* — Phong H Dang
(74) *Attorney, Agent, or Firm* — Patterson + Sheridan, LLP

(57) ABSTRACT

Embodiments herein describe using software or firmware to manage the device capability list of a PCIe device. That is, rather than relying on pure hardware to advertise the capabilities of a PCIe device, the embodiments herein permit software or firmware executing on a processor in the PCIe device to manage read and write requests associated with discovering the capabilities of the device and configuring the device.

20 Claims, 5 Drawing Sheets

11,734,217 B2

SOFTWARE OR FIRMWARE MANAGED HARDWARE CAPABILITY AND CONTROL CONFIGURATION FOR PCIE DEVICES

TECHNICAL FIELD

Examples of the present disclosure generally relate to using software or firmware in a processor to manage configuration transactions for a Peripheral Component Interconnect Express (PCIe) device.

BACKGROUND

In PCIe devices, a device capability list advertises various features supported by the PCIe device. Currently, the device capability list is stored in the configuration space in PCIe. Moreover, newer cache coherent protocols like Cache Coherent Interconnect for Accelerators (CCIX) and Compute Express link (CXL) also use the configuration space in PCIe to advertise the device capability list.

However, the configuration space, which typically includes memory in a PCIe controller (also referred to as a PCIe block), is set when the PCIe device is taped out (e.g., using register transfer logic (RTL)). But if the PCIe specification is updated, the configuration space cannot be updated to advertise capabilities associated with the new PCIe specification. As a result, the PCIe device cannot advertise functions according to the new PCIe specification. While the PCIe controller can have an interface to add user specific registers in programmable logic (assuming the PCIe device has programmable logic available) so that changes can be made after tape out, the interface is still provided in RTL which means making changes to the device capability list requires rebuilding everything in the programmable logic using a new bitstream.

SUMMARY

Techniques for operating a PCIe device are described. One example is an PCIe device that includes PCIe controller circuitry configured to receive configuration transactions from a host coupled to the PCIe device where the configuration transactions comprise at least one of read request to discover a capability of the PCIe device or a write request to enable a capability of the PCIe device. The PCIe device also includes a processor containing embedded software or firmware configured to, when executed by the processor, perform the configuration transactions after being alerted by the PCIe controller circuitry.

One example described herein is a method that includes receiving, at a PCIe device, configuration transactions from a host coupled to the PCIe device where the configuration transactions comprise at least one of a read request to discover a capability of the PCIe device or a write request to enable a capability of the PCIe device and performing the configuration transactions using embedded software or firmware in a processor in the PCIe device.

One example described herein is a method that includes an integrated circuit that includes a PCIe controller circuitry configured to receive configuration transactions from a host coupled to the IC where the configuration transactions comprise at least one of read request to discover a capability of the IC or a write request to enable a capability of the IC and a processor containing embedded software or firmware configured to, when executed by the processor, perform the configuration transactions after being alerted by the PCIe controller circuitry.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
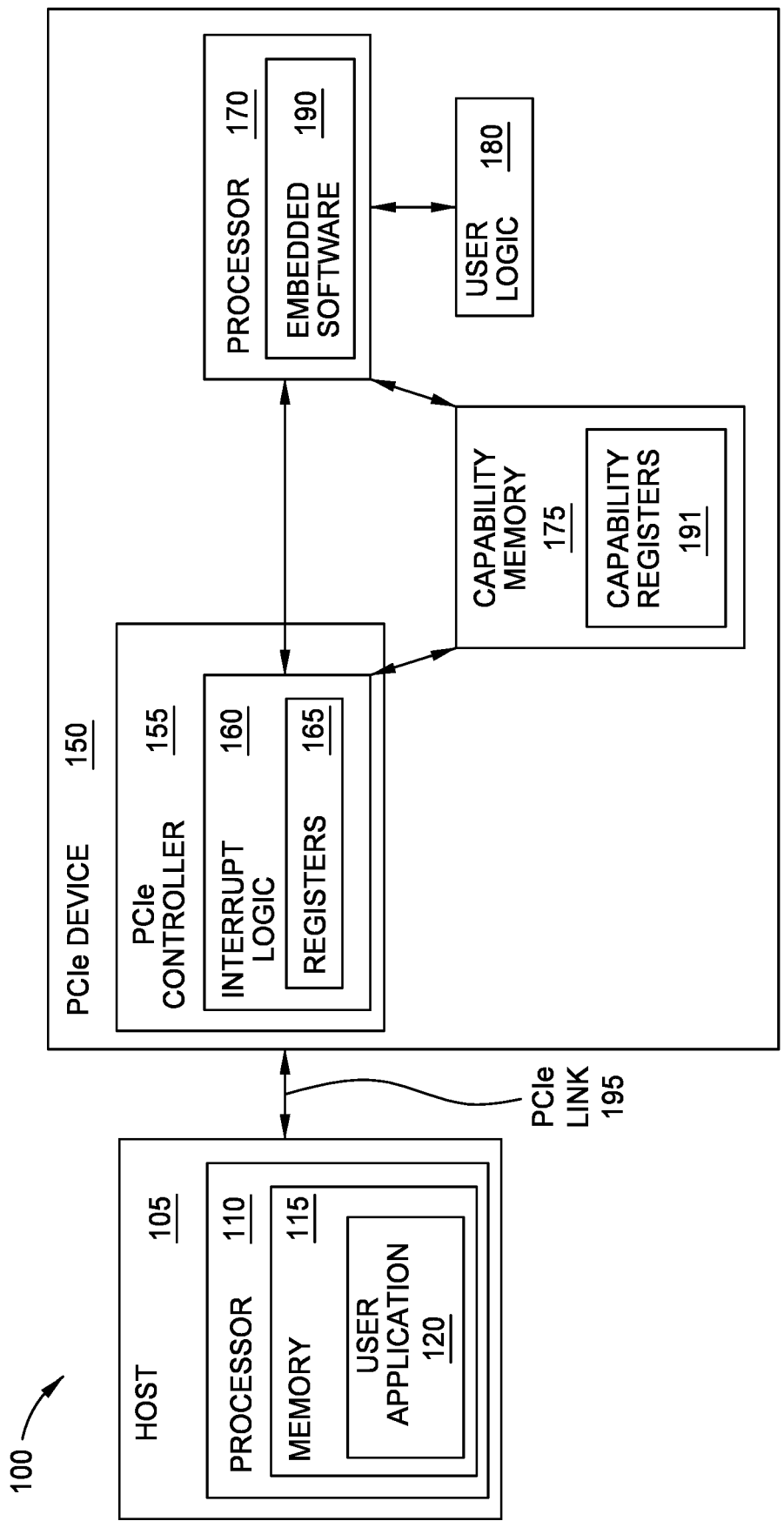
FIG. 1 is a block diagram of a computing system, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe using software or firmware to manage the device capability list of a PCIe device. That is, rather than relying purely on hardware to advertise the capabilities of a PCIe device, the embodiments herein permit software or firmware executing on a processor in the PCIe device to manage read and write requests associated with discovering the capabilities of the device and configuring the device. The capabilities of the device can be stored in a capability memory external to the PCIe controller which is managed by the software or firmware. The software or firmware can advertise the capabilities of the device using the capability memory. Further, if the PCIe device includes programmable logic (PL), the software or firmware can learn the capabilities of user logic in the PL and update the capability of the memory. In addition, if a new PCIe specification is released, the capability memory can be easily updated without having to rely on user logic registers in PL.

The software or firmware can be executed in a hardened processor in the PCIe device, or can be executed in a processor implemented in the PL of the PCIe device. In another embodiment, some of the functions of the software or firmware may be executed in part by a hardened processor while other functions are executed by a processor formed in the PL. Thus, the embodiments herein can be used in a PCIe device (e.g., an integrated circuit (IC) or PCIe board containing multiple ICs) that does not include any PL or a PCIe device that does include PL.

Non-limiting advantages of the embodiments herein include avoiding storing the device capability list in capability registers implemented in hardware logic where the register detail implementation might be error prone. Moreover, with advancement in protocol features, capabilities may change or be updated which can result in the hard logic implementation wasting the area in the integrated circuit using to store the unused/unneeded capability registers. However, using software/firmware managed capability registers to store the device capability list as proposed herein improves scalability and permits easy modification when capabilities are enhanced or when capability register bit definitions are finalized later (after tape out). Moreover, as the capabilities of the PCIe device change (e.g., a different memory module is add to the device), the device capability list can be updated without having to rely on PL.

FIG. 1 is a block diagram of a computing system 100, according to an example. The computing system 100 includes a host 105 that is coupled to a PCIe device 150 using a PCIe link 195. As described below, the PCIe device 150 can still use the configuration space of PCIe to advertise its capabilities, but instead of relying on an inflexible set of registers to store the device capability list, this list can be stored in capability memory 175 that is managed by embedded software 190 (or firmware). The embodiments herein are not limited to any particular set of device capabilities and examples can include CCIX and CXL capabilities such as CCIX Protocol DVSEC, CXL Register locator DVSEC, as well as PCIe capabilities of the PCIe device.

The host 105 includes a processor 110 which represents any number of processing elements that each can include one or more processor cores. The host 105 also includes memory 115 which can be non-volatile memory, volatile memory, or combinations thereof. In this example, the memory 115 stores a user application 120 which offloads task to the PCIe device 150. For example, the PCIe device 150 may be a graphics processing unit (GPU), accelerator card, encryption/decryption accelerator, compression accelerator, network interface card (NIC), system on a chip (SoC), application specific integrated circuit (ASIC), a field programmable gate array (FPGA), and the like. In one embodiment, the tasks offloaded by the user application 120 are assigned to user logic 180 in the PCIe device 150. The PCIe link 195 can be used to transmit tasks to the user logic 180 as well as receive results from the user logic 180.

The PCIe device 150 includes a PCIe controller 155 (also referred to as a PCIe block) that interfaces with the PCIe link 195. In one embodiment, the PCIe controller 155 is formed from hardened circuitry as opposed to PL which contains programmable circuitry. The PCIe controller 155 includes interrupt logic 160 for servicing read and write requests issued by the host 105 to discover and configure the capabilities of the PCIe device 150. The interrupt logic 160 can store the data associated with the read and write requests in registers 165. However, unlike in previous devices where the device capability list would be stored in the registers 165 in the PCIe controller 155, this list is instead stored in the capability memory 175 (or in registers in the processor 170) that are managed by the software 190. The registers 165 can be used to store the read and write requests before they are forwarded to the processor 170.

In one embodiment, the interrupt logic 160 uses an interrupt to instruct the processor 170, or more specifically, the embedded software 190, to handle the read or write request. In one embodiment, by having a dedicated processor 170 for handling the read and write requests regarding the capabilities of the PCIe device 150, it is guaranteed that responses to these configuration transactions are within the transaction window defined by the PCIe specification which is currently between 50 microseconds and 50 milliseconds. That is, some PCIe specifications set a window when configuration transaction must be handled and responded to by the PCIe device 150. In the various software/firmware managed approaches described herein, the PCIe device 150 can complete these transactions within the stipulated window, and thus, satisfy the PCIe specification.

In one embodiment, the capability memory 175 stores the device capability list in capability registers 191. In one embodiment, the device capability list is a linked list formed from the capability registers 191. In one embodiment, the capability memory 175 is random access memory (RAM) or other memory type that can be managed by the embedded software 190. The capability registers 191 can be updated as the capability of the PCIe device 150 changes, or as the PCIe specification changes. For example, with advancement in protocol features, capabilities may change or are updated. For instance, with CCIX enablement, newer CCIX capabilities were added, which were standardized much later after the transport specification was completed (post tape-out). Additionally, various capabilities undergo changes due to various ECN (Engineering Change Notice) etc. Moreover, the capabilities stored in the capability registers 191 can be changed to reflect changes in the makeup of the PCIe device 150 such as when a memory module is replaced with a different kind of memory. While FIG. 1 is described with the device capability list being stored in the capability registers 191, in another embodiment, this list may be stored in internal memory in the processor (assuming it has sufficient memory). In that situation, the capability memory 175 may be a single register which is used to store and retrieve capability data and payloads when performing read and write requests as described below.

In one embodiment, the processor 170 is formed from hardened circuitry, such as a general purpose processor with one or more processing cores. In another embodiment, the processor 170 is formed using PL instead of hardened circuitry. In yet another embodiment, the PCIe device 150 may use multiple processors to perform the embodiments described herein. In any case, the processor 170 is tasked with managing the device capability list and advertising the capabilities of the device 150 to the host. That is, when the processor 170 receives an interrupt from the interrupt logic 160, it can read or write to the capability registers 191, generate a capability advertisement for the host 105, or configure the user logic 180 to enable or disable a set of functions. The processor 170 can also update the device capability list as capabilities of the device 150 change, or in response to changes to the PCIe specification.

The user logic 180 is representative of any user function used to perform tasks for the user application 120. If the PCIe device 150 is an ASIC, the user logic 180 can be implemented using hardened circuitry. In that example, the user logic 180 may perform the same task or tasks throughout the lifetime of the device 150. However, if the PCIe device 150 is a SoC or FPGA that includes PL, the user logic 180 may be implemented in the PL in which case the user can reconfigure the PL to change the task or tasks performed by the user logic 180. Notably, updating the user logic 180 can also update the capabilities of the PCIe device 150. As such, the embodiments herein may update the device capability list as the user logic 180 is changed.

In one embodiment, all the components in the PCIe device 150 are implemented onto the same integrated circuit (IC) such as a ASIC, FPGA, or SoC. However, in another embodiment, the components in the PCIe device 150 are implemented on different ICs which may be disposed on the same substrate, e.g., a silicon interposer or a printed circuit board (PCB).

Figure 2:
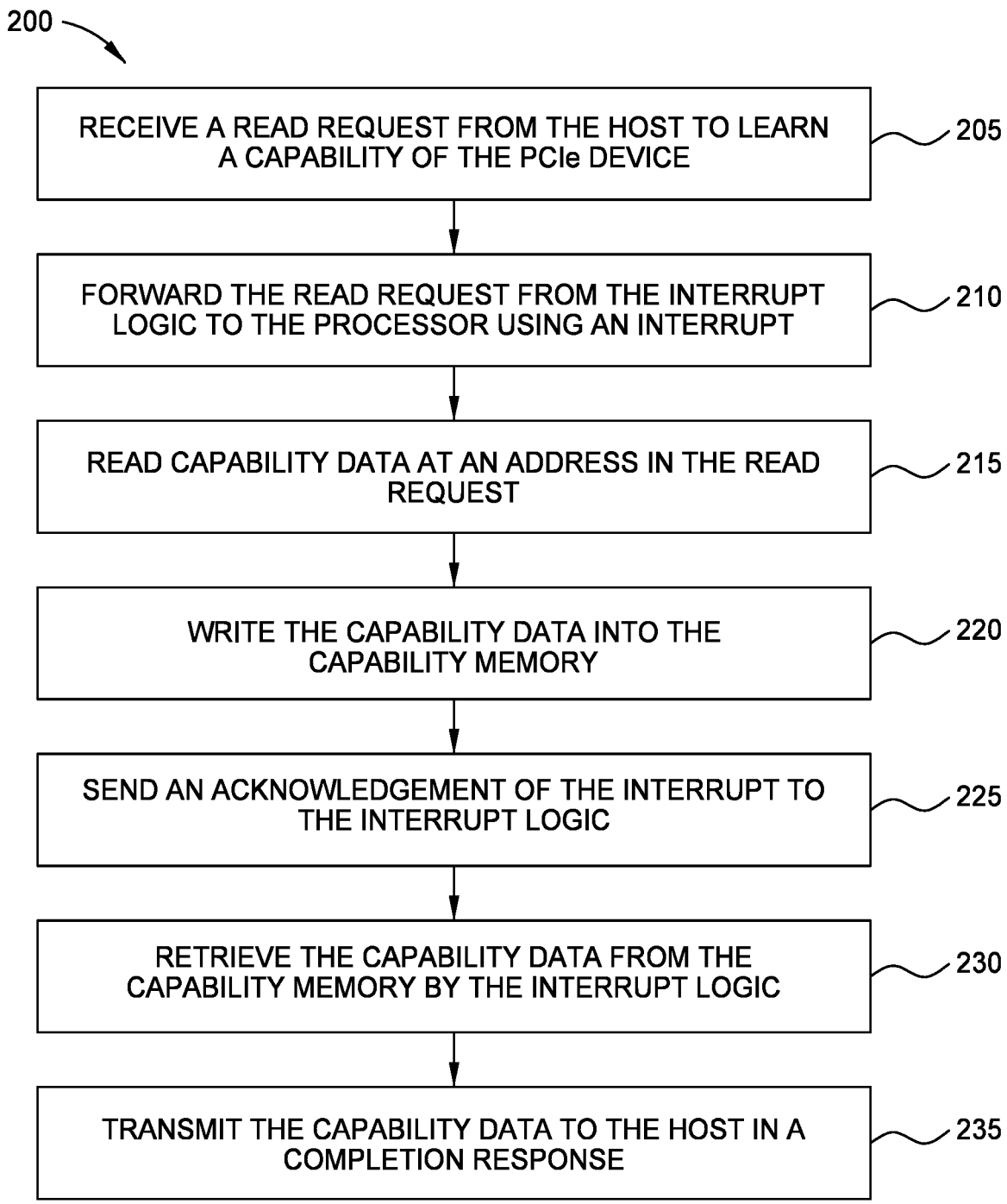
FIG. 2 is a flowchart for performing a read request to discover a capability of a PCIe device, according to an example.

FIG. 2 is a flowchart of a method 200 for performing a read request to discover a capability of a PCIe device, according to an example. At block 205, the PCIe controller, or more specifically, interrupt logic 160 in the PCIe controller 155 shown in FIG. 1 receives a read request from the host to learn a capability of the PCIe device. The PCIe specification establishes a procedure where the host can learn the capabilities of the PCIe device by transmitting read requests that include addresses to request information about a specific capability (e.g., whether the PCIe device has, or does not have, that capability).

At block 210, the interrupt logic forwards the read request to the processor using an interrupt or other kind of alert. In one embodiment, because the PCIe specification defines a window of time that the PCIe device should respond to read requests (e.g., a configuration transaction), raising an interrupt ensures the processor properly prioritizes the read request. However, in other embodiments, the read request may be processed in sufficient time without using an interrupt. For example, the processor may be a dedicated processor whose sole job is to respond to read/write requests from the host regarding the capabilities of the PCIe device. In that scenario, the PCIe controller can forward the read (or write) request to the processor without raising an interrupt signal.

At block 215, the processor (or the software/firmware executing in the processor) reads capability data at an address specified in the read request. In one embodiment, the address in the read request corresponds to a capability register that stores the device capability list. As mentioned above, the device capability list may be a linked list formed by the capability register. The address can specify one or more of these capability registers which store information regarding the capabilities of the PCIe device.

At block 220, the processor writes the capability data retrieved from the device capability list (e.g., retrieved from one or more of the capability registers) into the capability memory. In one embodiment, the capability memory also stores the capability registers that contain the device capability list. However, in other embodiments, the capability registers may be in a different memory than the capability memory (e.g., stored in memory in the processor). In any case, at block 220, the processor writes the capability data into a memory that is also accessible to the interrupt logic. As shown in FIG. 1, the interrupt logic can communicate with the capability memory 175 which means this memory 175 can be used by the processor to store the capability data associated with the read request.

At block 225, the processor sends an acknowledgement of the interrupt to the interrupt logic. This acknowledgement informs the interrupt logic that the processor has finished its part of the read request.

At block 230, the interrupt logic retrieves the capability data from the capability memory.

At block 235, the interrupt logic, or more generally, the PCIe controller transmits the capability data to the host in a completion response. Using multiple read requests, the host can determine the capabilities of the PCIe device and whether those capabilities match its own. From this, the host can determine which functions to enable (or disable) in the PCIe device. For example, if the host has a capability that the PCIe device lacks, or vice versa, the host may choose not to activate those functions but only activate the capabilities shared by the two systems.

Figure 3:
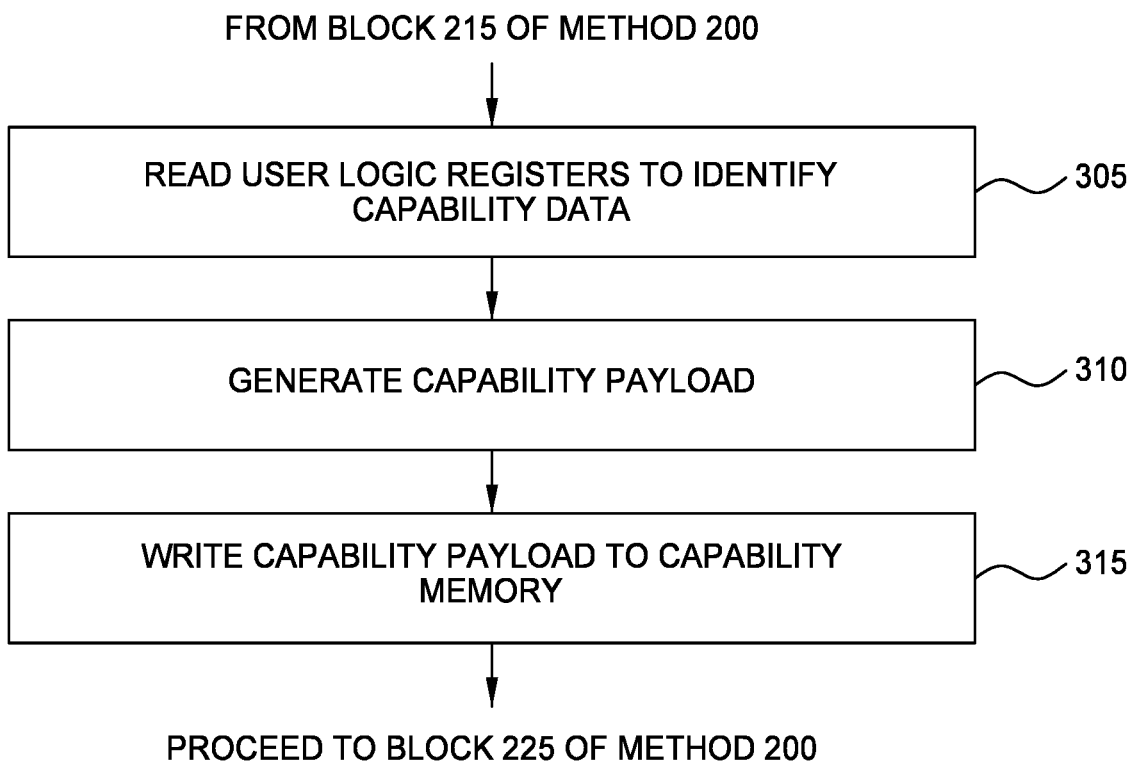
FIG. 3 is a flowchart for discovering a capability of a PCIe device, according to an example.

FIG. 3 is a flowchart of a method 300 for discovering a capability of a PCIe device, according to an example. The method 300 illustrates additional blocks that can be performed when responding to a read request from the host. In one embodiment, the method 300 may be used in CCIX or CXL implementations, or in PCIe devices with user logic defined in PL where querying the user logic to identify its capabilities is part of responding to read requests from the host.

The method 300 begins at block 305 (which may occur after block 215 of the method 200) where the processor reads user logic registers in the user logic to identify capability data. That is, in addition to performing block 215 of the method 200 where the processor queries the capability registers corresponding to the address in the read request, at block 305 the processor may also query the user logic to learn its capabilities. This can be used in CCIX and CXL where the user logic is implemented in PL, and thus, can change. For example, the user may decide to change the functions performed in the user logic (e.g., add or remove compression functions, cryptographic functions, neural network functions, and the like). Thus, the processor may query user logic registers in the PL to identify the current capabilities of the user logic before responding to the read request from the host.

At block 310, the processor generates a capability payload for responding to the host. This capability payload can include both the capability data retrieved from the user logic registers at block 305 as well as the capability data retrieved at block 215 of the method 200 using the address in the read request.

At block 315, the processor writes the capability payload to the capability memory. More generally, the processor writes the payload to a memory that is accessible to the interrupt logic in the PCIe controller. The method 300 can then return to block 225 of the method 200 where the capability payload is retrieved by the interrupt logic and forwarded to the host to complete the read request. Thus, the method 300 provides a technique for the processor to update the capabilities of the PCIe device as the functions performed by the user logic may change. However, in PCIe devices where the functions of the user logic remain fixed or static (e.g., in a ASIC implementation), the method 300 may not be used, and instead, only the method 200 can be used to respond to read requests from the host.

Figure 4:
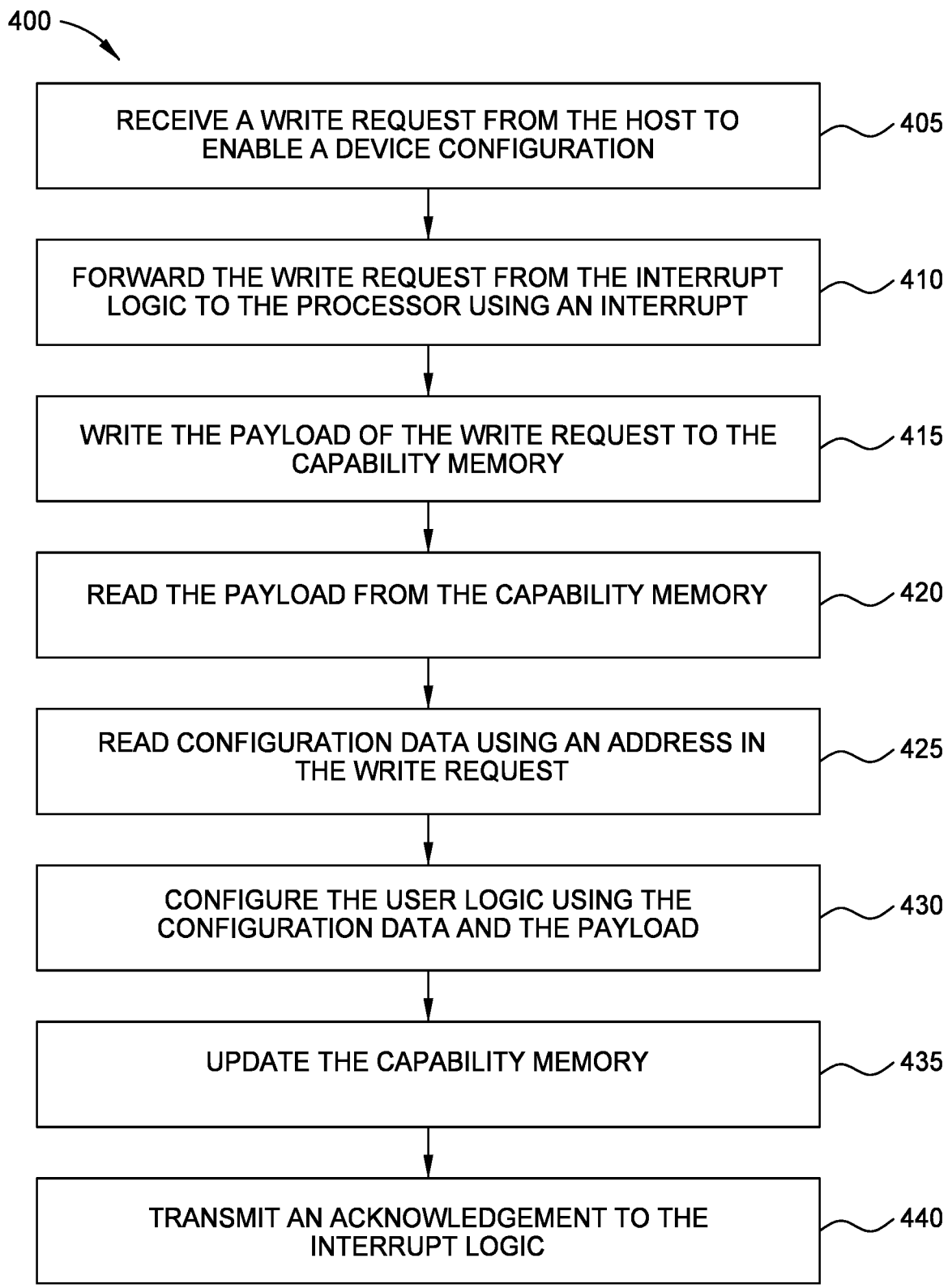
FIG. 4 is a flowchart for enabling a capability of a PCIe device using a write request, according to an example.

FIG. 4 is a flowchart of a method 400 for enabling a capability of a PCIe device using a write request, according to an example. At block 405, the PCIe controller in the PCIe device receives a write request from the host to enable a device configuration. In one embodiment, the method 400 is performed after the PCIe device has received and processed one or more read requests from the host. Based on those read requests, the host can have identified capabilities it has in common with the PCIe device. The host can then use one or more write requests to enable those capabilities in the PCIe device.

At block 410, the interrupt logic in the PCIe controller forwards the write request to the processor using an interrupt. In one embodiment, because the PCIe specification defines a window of time that the PCIe device should respond to write requests (e.g., a configuration transaction), raising an interrupt ensures the processor properly prioritizes the write request. However, in other embodiments, the write request may be processed in sufficient time without using an interrupt. For example, the processor may be a dedicated processor whose job is solely to respond to read/write requests from the host regarding the capabilities of the PCIe device. In that scenario, the PCIe controller can forward the write request to the processor without raising an interrupt signal.

At block 415, the interrupt logic writes the payload of the write request to the capability memory. In this example, the interrupt logic stores the payload at a memory location that is accessible to the processor so it can access the payload.

At block 420, the processor reads the payload from the capability memory. This may be performed in response to the processor receiving the interrupt.

At block 425, the processor reads configuration data from an address in the write request. In one embodiment, the address is part of the write request (e.g., a separate field) and can be an address of one of the capability registers storing the device capability list. The configuration data retrieved using the address can then be used to enable a particular capability or feature in the PCIe device.

At block 430, the processor configures the user logic using the configuration data and the payload. For example, the processor can program downstream user logic registers or ensure only writable bits are written. Doing so can enable a particular capability or feature (or a set of capabilities or features) in the PCIe device.

At block 435, the processor updates the capability memory to indicate that the particular capability is now enabled.

At block 440, the processor transmits an acknowledgement back to the interrupt logic in the PCIe controller, which in turn, can provide a completion response to the host. For PCIe, configuration write transactions are expected to provide completion responses to ensure that the configuration transaction reached the desired target.

The flowcharts in FIGS. 2-3 can take advantage of the fact that, in one embodiment, only one configuration transaction can be outstanding at any time from the host per the PCIe standard. As a result, there are no cases where software may be interrupted again to service another request when still processing a current read/write request.

Further, the capability memory used to store the capability data in block 215 of method 200, store the capability payload in block 315 of method 300, and store the payload in block 415 of method 400 may be a single register that stores this information. In that case, the device capability list (e.g., a configuration capability structure layout) can be stored in capability registers in the processor. Alternatively, the device capability list may be stored in capability registers in the capability memory as shown in FIG. 1.

Figure 5:
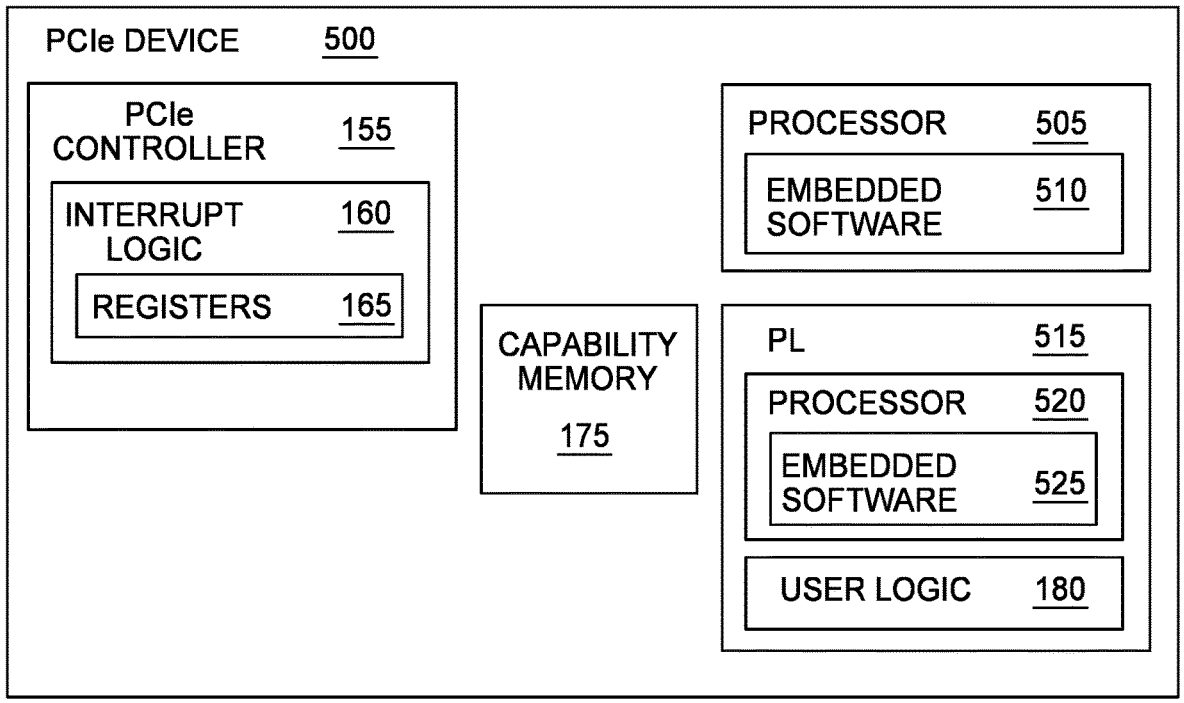
FIG. 5 is a block diagram of a PCIe device, according to an example.

FIG. 5 is a block diagram of a PCIe device 500, according to an example. Like the PCIe device 150 in FIG. 1, the PCIe device 500 also includes the PCIe controller 155, the interrupt logic 160, the registers 165, capability memory 175, and the user logic 180. For brevity, these components are not described here.

The PCIe device 500 includes a first processor 505 and a second processor 520. In one embodiment, the first processor 505 is implemented using hardened circuitry (e.g., is a general purpose processor) while the second processor 520 is formed using programmable circuitry in PL 515. For example, to ensure the configuration transactions (e.g., the read and write requests described in FIGS. 2-4) are completed in a specified window of time, the PCIe device 500 can use multiple processors 505, 520 to complete each transaction. For example, the first processor 505 may also be used to perform other functions in addition to handling the configuration transactions (i.e., the first processor 505 is not solely dedicated to handling the transactions). The first processor 505 may be unable to complete the configuration transactions within the specified window and still satisfy its other responsibilities. In this example, one or more of the tasks corresponding to the configuration transactions can be performed by the second processor 520 in the PL 515.

In one embodiment, the second processor 520 handles queries to the user logic 180. For example, the second processor 520 may read the user logic registers at block 305 of method 300 to identify capability data corresponding to the user logic. Also, the second processor 520 may configure the user logic at block 430 of method 400 using the configuration data and payload. As a result, this lightens the load on the first processor 505 so it can perform other tasks.

As shown, the first processor 505 includes embedded software 510 (or firmware) while the second processor 520 also includes embedded software 524 (or firmware). The embedded software 510 and 524 can be different. For example, the embedded software 510 may define the tasks that the first processor 505 performs during the configuration transactions while the embedded software 525 defines the tasks the second processor 520 performs during the configuration transactions. In this manner, the configuration transactions (e.g., the read/write requests in FIGS. 2-4) can be completed using two different processors that can be implemented using different types of circuitry. However, in another embodiment, rather than having one processor 505 formed from hardened circuitry and another formed from programmable circuitry, the PCIe device 500 may include multiple processors formed from hardened circuitry (e.g., multiple general purpose processors) that split the tasks associated with the configuration transactions.

Figure 6:
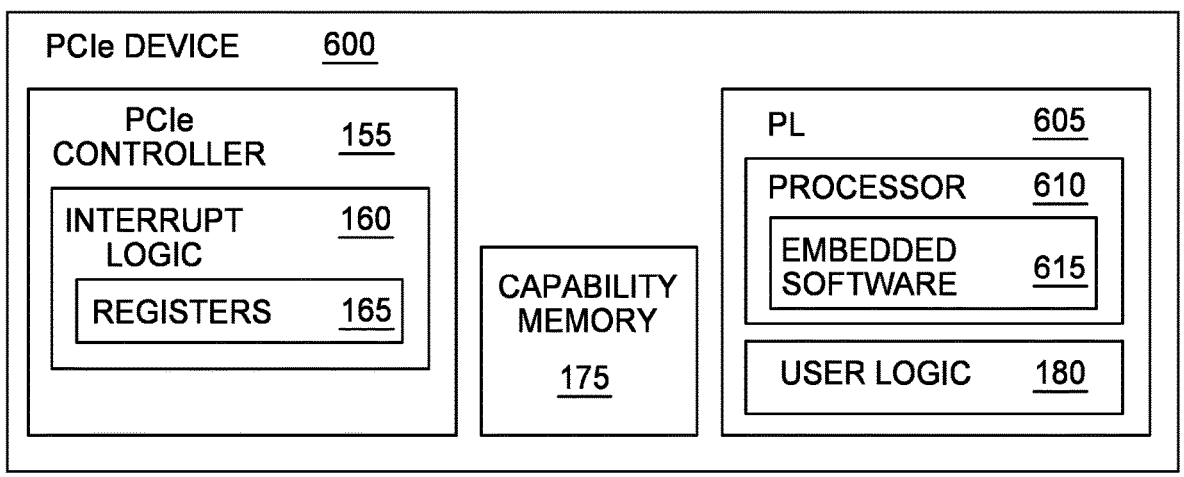
FIG. 6 is a block diagram of a PCIe device, according to an example.

FIG. 6 is a block diagram of a PCIe device 600, according to an example. Like the PCIe device 150 in FIG. 1, the PCIe device 500 also includes the PCIe controller 155, the interrupt logic 160, the registers 165, capability memory 175, and the user logic 180. For brevity, these components are not described here.

Unlike the PCIe device 500 in FIG. 5, the PCIe device 600 may not have a processor formed from hardened circuitry, or if it does, the processor is not used to perform configuration transactions. Instead, the PCIe device 600 includes a processor 610 in the PL 605 formed from programmable circuitry. The processor 610 includes embedded software 615 (or firmware) that performs the configuration transactions described in FIGS. 2-4, without the aid of a hardened processor.

In one embodiment, however, the processor 610 in the PL 605 may not be ready to handle the configuration transaction when system discovery first begins. That is, when the PCIe device 600 is first connected to the host and powered on, the processor 610 may not be immediately available to handle the configuration transactions. In that case, minimal code can be added to a hardened processor in the PCIe device 600 to respond with a request retry to the host until the PL 605 and the processor 610 becomes operational. Once the processor 610 in the PL 605 becomes operational, a handoff technique between the processor 610 in the PL 605 and the hardened processor can move the entire operation to the processor 610 so that the hardened processor no longer receives the read/write requests.

Further, although not shown, the PL 605 can include multiple processors for performing the configuration transactions. These processors can split the tasks associated with the configuration transactions as discussed above.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A PCIe device comprising:
PCIe controller circuitry configured to receive configuration transactions from a host coupled to the PCIe device, wherein the configuration transactions comprise at least one of a read request to discover a capability of the PCIe device or a write request to enable a capability of the PCIe device,
a processor containing embedded software or firmware configured to, when executed by the processor, perform the configuration transactions after being alerted by the PCIe controller circuitry, and
a capability memory accessible to both the PCIe controller circuitry and the processor, the capability memory is configured to store capability data when performing the configuration transactions,
wherein the embedded software or firmware is configured to, in response to receiving the read request, read first capability data from a memory location of the capability memory corresponding to an address in the read request.

2. The PCIe device of claim 1, wherein the processor is implemented in hardened circuitry.

3. The PCIe device of claim 1, wherein the processor is implemented in programmable logic.

4. The PCIe device of claim 3, further comprising a second processor implemented in hardened circuitry, wherein the second processor is configured to handle configuration transactions until the processor becomes available, and perform a handoff technique to move responsibility for performing the configuration transactions to the processor.

5. The PCIe device of claim 1, wherein the processor is configured to update the capability data of the capability memory.

6. The PCIe device of claim 5, wherein the embedded software or firmware is configured to, in response to receiving the read request write a payload into the capability memory, wherein the payload is based on the first capability data, wherein the PCIe controller circuit is configured to transmit the payload the host in a completion response.

7. The PCIe device of claim 6, wherein the embedded software or firmware is configured to, in response to receiving the read request:
read user logic registers to identify second capability data corresponding to user logic in the PCIe device;
wherein the payload is further based on the second capability data.

8. The PCIe device of claim 7, further comprising:
programmable logic, wherein the user logic is implemented in the programmable logic.

9. The PCIe device of claim 5, wherein the embedded software or firmware is configured to, in response to receiving the write request:
read a payload from the write request from the capability memory, wherein the PCIe controller stored the payload in the capability memory;
read configuration data using an address in the write request;
configure user logic in the PCIe device using the configuration data and the payload; and
updating the capability memory.

10. A method comprising:
receiving, at a PCIe device, configuration transactions from a host coupled to the PCIe device, wherein the configuration transactions comprise at least one of a read request to discover a capability of the PCIe device or a write request to enable a capability of the PCIe device; and
performing the configuration transactions using embedded software or firmware in a processor in the PCIe device, wherein the PCIe device comprises a capability memory accessible by both PCIe controller circuitry and the processor, the capability memory stores capability data when performing the configuration transaction,
wherein, in response to receiving the read request, the embedded software or firmware reads first capability data from a memory location of the capability memory corresponding to an address in the read request.

11. The method of claim 10, further comprising, in response to receiving the read request:
writing, using the embedded software or firmware, a payload into a capability memory, wherein the payload is based on the first capability data; and
transmitting the payload the host in a completion response.

12. The method of claim 11, further comprising:
reading, using the embedded software or firmware, user logic registers to identify second capability data corresponding to user logic in the PCIe device, wherein the payload is further based on the second capability data.

13. The method of claim 12, wherein the user logic is implemented in programmable logic in the PCIe device.

14. The method of claim 10, further comprising, in response to receiving the write request:
storing a payload from the write request into the capability memory in the PCIe device;
reading, using the embedded software or firmware, the payload from the capability memory;
reading, using the embedded software or firmware, configuration data using an address in the write request;
configuring, using the embedded software or firmware, user logic in the PCIe device using the configuration data and the payload; and
updating, using the embedded software or firmware, the capability memory.

15. The method of claim 10, wherein the processor is implemented using hardened circuitry.

16. An integrated circuit (IC), comprising:
PCIe controller circuitry configured to receive configuration transactions from a host coupled to the IC, wherein the configuration transactions comprise at least one of read request to discover a capability of the IC or a write request to enable a capability of the IC;
a processor containing embedded software or firmware configured to, when executed by the processor, perform the configuration transactions after being alerted by the PCIe controller circuitry; and
a capability memory accessible to both the PCIe controller circuitry and the processor, the capability memory is configured to store capability data when performing the configuration transactions,
wherein the embedded software or firmware is configured to, in response to receiving the read request, read first capability data from a memory location of the capability memory corresponding to an address in the read request.

17. The IC of claim 16, wherein the processor is implemented in hardened circuitry.

18. The IC of claim 16, wherein the processor is implemented in programmable logic.

19. The IC of claim 18, further comprising a second processor implemented in hardened circuitry, wherein the second processor is configured to handle configuration transactions until the processor becomes available, and perform a handoff technique to move responsibility for performing the configuration transactions to the processor.

20. The IC of claim 16, wherein the processor is configured to update a capability list storing a list of PCIe capabilities.

* * * * *